United States Patent
Moen

[11] 3,713,551
[45] Jan. 30, 1973

[54] ATTACHMENT FOR SILO UNLOADERS

[76] Inventor: Forrest E. Moen, Route 3, Houston, Minn. 55943

[22] Filed: Sept. 22, 1971

[21] Appl. No.: 182,692

[52] U.S. Cl. .......................... 214/17 CB, 214/17 DB
[51] Int. Cl. ............................................. B65g 65/30
[58] Field of Search ............ 214/17 CB, 17 DB, 17 A; 302/56; 193/3, 4, 16

[56] References Cited

UNITED STATES PATENTS

| | | | |
|---|---|---|---|
| 2,963,327 | 12/1960 | Seynour | 302/56 |
| 3,337,065 | 8/1967 | Freeman | 214/17 CB |

*Primary Examiner*—Albert J. Makay
*Assistant Examiner*—Kenneth Noland
*Attorney*—Merchant & Gould

[57] ABSTRACT

Apparatus for reversibly converting a silo unloader to a silage distributor for use in uniformily filling a silo. The apparatus includes means for pivotably attaching a silage discharge chute to the silage blower housing so as to allow pivotable movement between a first position during the silo unloading operation and a second position during the silage distribution operation. A distribution board is fixedly mounted on the discharge chute and, when the discharge chute is in its second position, deflects silage incident thereon toward the wall of the silo. Finally, a drive member is provided which is connectable to a rotatable portion of the blower housing for supporting the discharge chute in its second position and for causing rotation thereof.

6 Claims, 6 Drawing Figures

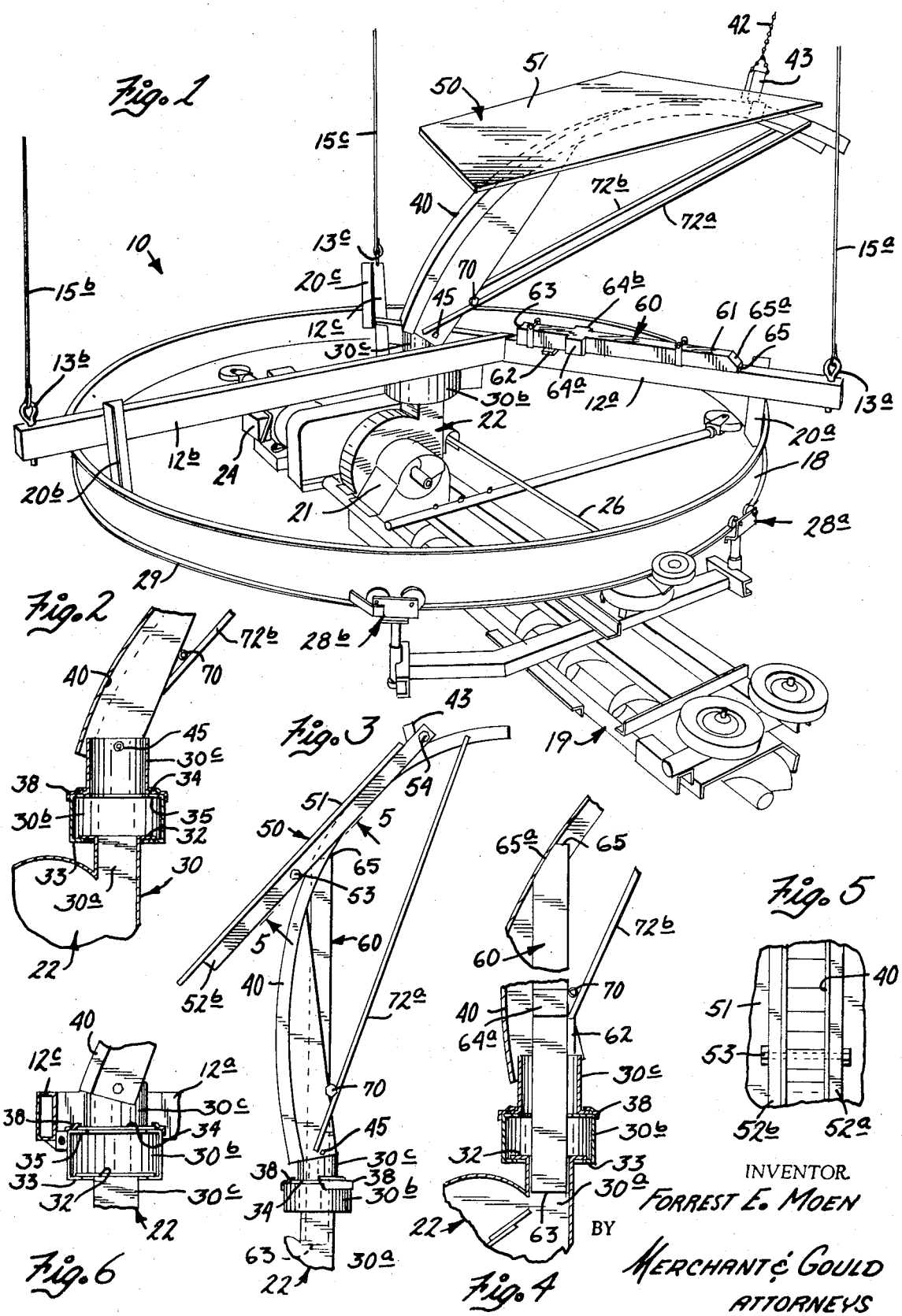

3,713,551

ATTACHMENT FOR SILO UNLOADERS

BACKGROUND OF THE INVENTION

1. Field of the Invention

The present invention pertains to apparatus attachable to a silo unloader for reversibly converting such machinery to a silage distributor for use in filling a silo bin.

2. Description of the Prior Art

Silo unloaders for mechanically removing silage from silo bins are well known. In this regard, numerous different styles and designs are presently commercially available. Further, as a result of recent developments within the silo unloader art, machines are now available which can be reversibly modified to provide a silage distribution function during the silo filling process. One such combination silo unloader and silage distributor is the Volumatic Silo Unloader manufactured and sold by the Jamesway Division of the Butler Manufacturing Company. To provide this dual silo unloader and silage distributor feature, the silage discharge chute is removed from the silo bin (or attached to the unloader frame structure) during the silo filling operation and distributor board is rotatably mounted over the discharge hole in the unloader. This distribution board revolves slowly at the top of the silo during the filling operation deflecting the falling silage incident thereon toward the wall of the silo. Such distribution of the silage has been found to (1) increase the capacity of the silo bin (up to a 20 percent increase), (2) reduce silage spoilage, (3) reduce the pressure exerted by the silage on the silo wall, and (4) facilitate unloading of the silo.

Whereas the aforementioned advantages render combination silo unloaders and silage distributors highly desirable, the presently available machinery has not been without disadvantages. Primarily, these disadvantages arise from the difficulty in converting the silo unloader to a silage distributor (and vice versa). With the apparatus presently available, the disconnecting and dismantling of the discharge chute so as to allow its removal from the silo bin and the subsequent mounting of the distributor board is a difficult and time consuming process. The reverse operation in reconverting the machinery to a silo unloader is equally difficult and time-consuming. Furthermore, even when properly mounted, the distributor board is frequently not as secure as is desirable. Thus, it can be easily appreciated that apparatus which allows rapid and convenient conversion of a silo unloader to a silage distributor (and vice versa) is commercially desirable.

SUMMARY OF THE INVENTION

The present invention pertains to apparatus for reversibly converting a silo unloader to a silage distributor for use in filling a silo bin. The apparatus includes means for pivotably mounting a silage discharge chute for movement between a first position for use during the silo unloading operation and a second position for use in the silage distribution operation. A distribution board is fixedly attached to the upper side of the discharge chute and, when the discharge chute is positioned in its second position, deflects the silage introduced into the silo toward the wall thereof. A removeable drive member is provided for supporting the discharge chute in its second position and connecting a rotatable portion of the unloader (e.g., preferably a rotatable portion of the silage discharge blower) to the discharge chute so as to cause rotation of the discharge chute and the distribution board fixedly attached thereto. Upon completion of the silage distribution operation, the drive member can be disconnected and the discharge chute returned to its first position to allow conventional unloading of the silage stored within the silo.

The above-described apparatus allows rapid and essentially effortless conversion of a silo unloader to a silage distributor (and vice versa). Unlike the presently available machinery, the present invention does not necessitate dismantling and removal of the discharge chute from the silo bin and the subsequent mounting of a distribution board for use in the silage distribution operation. Rather, the distribution board remains fixedly attached to the discharge chute during both the silo unloading and silage distribution operations and means are provided for simply pivotably moving the discharge chute and attached distributor board between a first position for use in the unloading operation and a second position for use in the distribution operation. Thus, it can be readily seen that the present invention greatly simplifies the conversion of silo unloaders to silage distributors (and vice versa). Furthermore, the present apparatus has been found to be highly reliable, providing both efficient unloading and distribution of the silage. Further advantages of the present invention, such as the ease in which it can be adapted to presently available silo unloaders and particularly the aforementioned Jamesway Volumatic Silo Unloader, will become apparent from a reading of the detailed description which follows.

BRIEF DESCRIPTION OF THE DRAWINGS

FIG. 1 is a fragmented, perspective view of the combination silo unloader and silage distributor provided by the present invention;

FIG. 2 is a cross-sectional view showing the pivotal attachment of the discharge chute to the silage impeller for exhausting the silage from the silo through the discharge chute;

FIG. 3 is a side elevational view showing the placement of the drive member provided by the present invention for properly supporting the discharge chute and distribution board during the silage distribution operation and for causing the rotation thereof;

FIG. 4 is a cross-sectional view showing the positioning of the drive member within the silage impeller and its engagement with the unloader discharge chute;

FIG. 5 is an enlarged fragmented, cross-sectional view taken along the line 5—5 of FIG. 3; and FIG. 6 is a fragmented, detailed view showing the attachment of the silage impeller to the frame structure of the silage gathering means.

DETAILED DESCRIPTION OF THE PREFERRED EMBODIMENT

Referring now to the drawings, and particularly to FIG. 1, the numeral 10 generally designates the combination silo unloader and silage distributor provided by the present invention. As shown in FIG. 1, the silage gathering means for unloading the silage from the silo includes a frame structure having three generally radial and interlocking support arms 12a, 12b and 12c. An eyelet 13a, 13b and 13c, respectively, is attached adjacent the outermost end of each of the support arms 12a, 12b and 12c, respectively. Cables 15a, 15b and 15c are attached to the eyelets 13a, 13b and 13c, respectively, and extend upwardly to a suspension system (not shown) mounted in the upper portion of the silo bin. This provides three-point suspension of the machinery 10 maintaining the machinery level within the silo. Also, the suspension system allows vertical movement of the machinery 10 by means such as a rachet-type hoist or a manual or motorized worm gear hoist (not shown).

A drive ring 18 is suspended within the silo by three support members 20a, 20b and 20c, which extend vertically downward from their attachment to the support arms 12a, 12b and 12c, respectively. A conventional auger 19 is mounted for rotation about the drive ring 18. Auger 19 cuts the stored silage and feeds it to the unloader discharge impeller shown as a screw-feed impeller 21 and a high-speed blower 22. Electric drive means 24 are mounted on the auger support bracket and drive the auger 19 about the drive wheel 18 by way of drive means such as a toothed drive wheel (not shown) and a slip-clutch arrangement 26. As shown, the auger 19 is supported within the silo by the engagement of support and guide means 28a and 28b with an outwardly directed flange 29 about the lower edge of drive ring 18 and the attachment of the blower 22 to the support arm 12b.

As can be seen particularly well in FIG. 2, the blower 22 includes a discharge housing 30 having vertically extending inner, intermediate and outer conduit sections designated 30a, 30b and 30c, respectively. Innermost or lower conduit section 30a has a generally square transverse cross-section and includes a flange 32 extending laterally outward therefrom about the outer or uppermost edge thereof. Flange 32 engages a laterally inwardly directed flange 33 of the enlarged intermediate conduit section 30b. This journals conduit section 30a within the stationary section 30b allowing rotational movement of section 30a upon rotation of auger 19 about drive ring 18. As can be seen in FIG. 6, the intermediate section 30b is fixedly attached to the support arm 12b. Finally, the outermost conduit section 30c has a generally circular transverse cross-section of slightly larger dimension than inner section 30a. The lower or inner surface of an outwardly directed flange portion 34 about the lowermost end of conduit section 30c rests upon an inwardly directed flange portion 35 of the intermediate conduit section 30b. A cap member 38 is attached to intermediate section 30b and engages the outer or upper surface of flange 34 to retain conduit section 30c in its upright position and to allow rotational movement thereof relative to fixed conduit section 30b.

As can be further seen, an inverted U-shaped discharge chute 40 is connected to the upper conduit section 30c and extends arcuately upward and outward to one of a plurality of vertically spaced doors (not shown) in the wall of the silo. Discharge chute 40 receives silage impelled outwardly from blower 22 and conveys the silage through the door in the wall of the silo. A chain 42 is attached to an upright ear 43 mounted on the upper side of discharge chute 40. Chain 42 can be fastened to the wall of the silo so as to immobilize the discharge chute during the silo unloading process assuring that the silage will pass through the silo door. Various other means for immobilizing discharge chute 40 can also be utilized and, for that matter, the chute 40 can be simply allowed to rest on the silo door frame.

My invention resides in apparatus for reversibly converting the above-described machinery to a silage distributor. First, means are provided for pivotally mounting the discharge chute 40 within the silo. As shown, this means is in the form of a pair of pins 45 which pivotally attach chute 40 to the uppermost conduit section 30c. Pins 45 are attached to the outer surface of conduit section 30c in an oppositely disposed manner and each extends through a different one of the sidewalls of discharge chute 40 so as to allow rotation thereabout. As will be subsequently described in greater detail, this pivotal attachment allows movement of the discharge chute 40 between a first position (such as shown in FIG. 1) for use in the silo unloading operation and a second position (such as shown in FIGS. 3 and 4) for use in the silage distribution operation. The pins 45 are standard equipment on the above-mentioned Jamesway Volumatic Silo Unloader.

Next, I provide a distributor board 50 which is fixedly attached to the discharge chute 40. As can be best seen in FIGS. 3 and 5, the distributor board 50 includes a flat, rectangular-shaped board 51 (e.g. a piece of ½ inch plywood) for directing the silage incident thereon toward the walls of the silo. The board 51 is fastened to two connecting members 52a and 52b which are attached to the side walls of the discharge chute 40. In attaching the distributor board 50, the two connecting members 52a and 52b are first positioned along the outside wall surfaces of the discharge chute 40 and then clamped thereto by a threadedly adjustable bolt 53 extending between the connecting members 52a and 52b. A second bolt 54 extends between the two connecting members 52a and 52b adjacent the uppermost ends thereof and engages the upperside of the upright ear 43 so as to assure the prevention of downward movement of the distribution board 50 along discharge chute 40. Board 51 is then attached (e.g., nailed) to the members 52a and 52b. Other means for fastening the distributor board 50 to discharge chute 40 can, of course, be utilized.

Finally, I provide a drive member generally designated 60 for supporting the discharge chute 50 in its second position and for operatively connecting the rotatable blower conduit section 30a to the discharge chute 40 for causing rotation thereof. The drive member 60 is in the form of a rigid, elongated member 61 having a square transverse cross-section of slightly smaller dimensions than the inner dimensions of square blower conduit section 30a. For the purpose subsequently described, elongated member 61 includes a stop member 62 projecting outwardly from a side thereof adjacent a first end 63. Additionally, two oppositely disposed spacer members 64a and 64b are attached to opposite sides of the drive member 60 intermediate the stop member 62 and a second end 65 of elongated member 61. Spacer members 64a and 64b project laterally outward from the elongated member 61 a distance sufficient to allow the drive member 60 to fit snugly between the side walls of discharge chute 40. As can be seen in the drawings, the second end 65 of elongated member 61 includes an inclined portion 65a for engaging the discharge chute 40 as subsequently described.

In operation, the machinery 10 is preferably positioned as shown in FIG. 1 for use during the silo unloading operation. During this operation, the discharge chute 40 is in its immobile first position having its unpivoted end in communication with a door in the silo. Thus, the silage introduced into discharge chute 40 by the high speed blower 22 is conveyed outwardly to the exterior of the silo. During this unloading, the drive member 60 is preferably attached to one of the supporting arms 12a–12c (e.g., arm 12a) for storage purposes.

When it is desired to convert the machinery 10 to a silage distributor, the chain 42 is disconnected and the discharge chute 40 pivoted in a counterclockwise direction (from the position shown in FIG. 1) to its second position such as shown in FIG. 3. After pivoting the discharge chute 40 to this position, the drive member 60 is then inserted into the blower conduit housing 30 until the stop member 62 engages the upper end of outermost conduit section 30c. So positioned, the first or lowermost end 63 of the vertically extending member 61 snugly engages the inner walls of lowermost conduit section 30a and the inclined end portion 65a of second end 65 engages the inner surface of the bottom wall of the inverted U-shaped chute 40. A stud 70 attached to the drive member 60 engages two discharge chute braces 72a and 72b to assure the prevention of further downward movement of drive member 60 into blower housing 30 and to prevent further counterclockwise motion of discharge chute 40 past its second position (see FIGS. 3 and 4). Further, as can be seen in FIG. 6, the spacer members 64a and 64b snugly engage the inner surfaces of the side walls of discharge chute 40 providing for the rotation of chute 40 upon rotation of drive member 60.

With drive member 60 so positioned, the discharge chute 40 is retained in its second position. This positions distributor board 50 in a position so as to deflect toward the silo wall the silage introduced into the silo through the top thereof and incident on the board 51. Further, this positioning of the drive member 60 operatively connects the rotatable conduit portion 30a to the discharge chute 40 causing rotation of the discharge chute 40 and the attached distribution board 50 upon rotation of the auger 20 and blower 22. Thus, during the silo filling operation, distributor board 50 rotates slowly providing a circular distribution of the silage about the silo wall.

Upon completion of the silo filling operation, the apparatus 10 can be reconverted to a silo unloader by removal of the drive member 60 from the impeller housing 30. Upon removal of the drive member 60, the discharge chute 40 is pivoted to its first position and the chain 42 reattached to immobilize the chute during the silo unloading operation. Drive member 60 is again stored on support arm 12a for future use.

Thus, from the above, it can be seen that the present invention provides apparatus which greatly facilitates the conversion of a silo unloader to a silage distributor and vice versa. However, since numerous modifications to the above device will be readily apparent to the artisan, it is my intent to be limited solely by the spirit and scope of the appended claims.

What is claimed is:

1. A combination silo unloader and silage distributor, comprising:
    a. means rotatable in a generally horizontal plane for gathering the silage stored within the silo;
    b. a silage discharge chute extending upwardly and outwardly from said silage gathering means;
    c. means for pivotably mounting said discharge chute within the silo for movement between a first position for use during the unloading operation and a second position for use during the silage distribution operation, said discharge chute communicating with the silage gathering means and the exterior of the silo when in said first position;
    d. a distributor board mounted on said discharge chute for deflecting silage incident thereon toward the wall of said silo when said discharge chute is positioned in said second position; and
    e. a transmission drive member removeably connectable to said rotatable silage gathering means and inter-engageable with said discharge chute for supporting said discharge chute in said second position during the silage distribution operation and for causing rotation of said discharge chute and attached distributor board upon rotation of said silage gathering means.

2. The combination silo unloader and silage distributor of claim 1 including silage impeller means having a silage discharge conduit wherein:
    a. said silage impeller means is mounted on said rotatable silage gathering means for communication therewith; and
    b. said pivotable mounting means pivotably attaches said discharge chute to said silage discharge conduit for movement between said first and second positions.

3. The combination silo unloader and silage distributor of claim 2 wherein:
    a. said silage discharge conduit extends generally vertically upward and includes an upper conduit section rotatably connected to a lower conduit section rotatable with said silage gathering means;
    b. said discharge chute is pivotably attached to said upper conduit section; and
    c. said drive member is removeably insertable through said upper conduit section to matedly engage said lower conduit section and extends generally vertically upward to engage said discharge chute for causing said rotation thereof.

4. The combination silo unloader and silage distributor of claim 3 wherein:
    a. said discharge chute is in the form of an inverted U-shaped member; and
    b. said drive member includes an uppermost end which engages the bottom wall of said inverted U-shaped member and oppositely disposed side surfaces which engage the side walls of said U-shaped member.

5. The combination silo unloader and silage distributor of claim 4 wherein said distributor board is attached to the upper side of said discharge chute and includes connecting members which engage the side walls thereof for securing said board to said chute.

6. In silo unloading machinery of the type including rotatable silage gathering means and a discharge chute in communication with the rotatable silage gathering means and the exterior of the silo, apparatus for reversibly converting the silo unloader to a silage distributor for use in the silo filling operation, comprising:
 a. means for pivotably mounting said discharge chute within said silo for movement between a first position for use during the silo unloading operation and a second position for use during the silage distribution operation;
 b. a distributor board fixedly secureable to the discharge chute for deflecting silage incident thereon toward the wall of the silo when said discharge chute is in said second position; and
 c. a drive member removeably connectable to said rotatable silage gathering means for maintaining said discharge chute in said second position and for causing the rotation thereof.

* * * * *